United States Patent
Li (10) Patent No.: US 8,363,612 B2
(45) Date of Patent: Jan. 29, 2013

(54) CONCURRENT TRANSMISSION OF MULTIPLE SIGNALS IN A WIRELESS NETWORK

(75) Inventor: Li Li, Edison, NJ (US)

(73) Assignee: Alcatel Lucent, Paris (FR)

( * ) Notice: Subject to any disclaimer, the term of this patent is extended or adjusted under 35 U.S.C. 154(b) by 338 days.

(21) Appl. No.: 12/722,087

(22) Filed: Mar. 11, 2010

(65) Prior Publication Data

US 2011/0222468 A1 Sep. 15, 2011

(51) Int. Cl.
*H04W 4/00* (2009.01)
*H04W 72/00* (2009.01)
*H04B 1/00* (2006.01)
*H04B 15/00* (2006.01)

(52) U.S. Cl. ........ 370/329; 370/336; 370/345; 370/349; 375/133; 375/346; 455/450; 455/501; 455/509; 455/63.1

(58) Field of Classification Search ........... 370/329, 370/336, 345, 349; 375/133, 346; 455/450, 455/501, 509, 63.1
See application file for complete search history.

(56) References Cited

U.S. PATENT DOCUMENTS

| | | | |
|---|---|---|---|
| 7,574,179 B2 * | 8/2009 | Barak et al. ............. | 455/101 |
| 7,593,729 B2 * | 9/2009 | Barak et al. ............. | 455/435.1 |
| 7,623,561 B2 | 11/2009 | Suzuki | |
| 7,647,073 B2 | 1/2010 | Sung et al. | |
| 7,653,142 B2 | 1/2010 | Ketchum et al. | |
| 7,689,240 B2 * | 3/2010 | Anderson ................ | 455/522 |
| 7,773,558 B2 * | 8/2010 | Cho et al. ................ | 370/329 |
| 7,983,366 B2 * | 7/2011 | Talwar et al. ............ | 375/346 |
| 8,068,560 B2 * | 11/2011 | Lee et al. ................ | 375/316 |
| 2007/0197256 A1 * | 8/2007 | Lu et al. ................. | 455/552.1 |
| 2008/0219374 A1 * | 9/2008 | Fernandez-Corbaton et al. ................. | 375/267 |
| 2008/0232258 A1 * | 9/2008 | Larsson et al. ........... | 370/238 |
| 2010/0226293 A1 * | 9/2010 | Kim et al. ............... | 370/280 |
| 2010/0227613 A1 * | 9/2010 | Kim et al. ............... | 455/434 |
| 2010/0232528 A1 * | 9/2010 | Li et al. .................. | 375/260 |
| 2011/0103530 A1 * | 5/2011 | Luo et al. ................ | 375/346 |
| 2011/0111761 A1 * | 5/2011 | Luo et al. ................ | 455/450 |

OTHER PUBLICATIONS

Sachin Katti, et al., "Embracing Wireless Interference: Analog Network Coding," Proceedings of the ACM SIGCOMM, Kyoto, Japan, Aug. 2007, pp. 397-408.
Shyamnath Gollakota, et al., "Interference Alignment and Cancellation," Proceedings of the ACM SIGCOMM, Barcelona, Spain, Aug. 2009 (12 pages).
Viveck R. Cadambe, et al., "Interference Alignment and Degrees of Freedom of the K-User Interference Channel," IEEE Transactions on Information Theory, vol. 54, No. 8, Aug. 2008, pp. 3425-3441.

* cited by examiner

*Primary Examiner* — Alpus H Hsu (74) *Attorney, Agent, or Firm* — Mendelsohn, Drucker & Associates, P.C.; Yuri Gruzdkov; Steve Mendelsohn (57) ABSTRACT

A method for concurrent transmission of multiple radio-frequency signals in a wireless network. The method is executed at a node of the wireless network and makes use of the node's knowledge of local network topology, locations of certain packets in the node's neighborhood, and local state of the radio-frequency (RF) channel to identify a relatively wide range of different opportunities for zero-forcing, aligning, and/or canceling unwanted RF signals at the receiving node(s). The identified opportunities are communicated to the neighbor nodes to advantageously cause concurrent transmissions of a relatively large number of packets.

17 Claims, 6 Drawing Sheets

CONCURRENT TRANSMISSION OF MULTIPLE SIGNALS IN A WIRELESS NETWORK

BACKGROUND

1. Field of the Invention

The present invention relates to wireless networks and, more specifically but not exclusively, to identification and use of zero-forcing, interference-alignment, and/or interference-cancellation opportunities for wireless transmissions.

2. Description of the Related Art

This section introduces aspects that may help facilitate a better understanding of the invention(s). Accordingly, the statements of this section are to be read in this light and are not to be understood as admissions about what is in the prior art or what is not in the prior art.

Wireless interference is typically considered harmful. As result, a wireless network is usually configured to prevent transmitters from interfering with one another. For example, a wireless network might be configured to allocate the wireless medium to a specified transmitter using time division multiple access (TDMA) or to employ a contention-based collision-avoidance mechanism similar to that of IEEE 802.11. However, as unicast wireless transmissions approach the Shannon capacity, it becomes progressively more difficult to realize further throughput increases without allowing concurrent transmissions and the concomitant signal interference. While some prior-art techniques allow concurrent transmission of multiple wireless signals, each of such techniques typically targets only a corresponding, very specifically and narrowly defined type of concurrent-transmission opportunities and, as such, misses and leaves unutilized many other beneficial opportunities.

SUMMARY

Disclosed herein are various embodiments of a method for concurrent transmission of multiple radio-frequency signals in a wireless network. The method is executed at a node of the wireless network and makes use of the node's knowledge of local network topology, locations of certain packets in the node's neighborhood, and local state of the radio-frequency (RF) channel to identify a relatively wide range of different opportunities for zero-forcing, aligning, and/or canceling unwanted RF signals at the receiving node(s). The identified opportunities are communicated to the neighbor nodes to advantageously cause concurrent transmissions of a relatively large number of packets.

According to one embodiment, provided is, at a first node of a wireless network, a node-implemented method for concurrent transmission of multiple radio-frequency signals between a plurality of transmitting and receiving nodes of the wireless network, the method having the steps of: (A) for a selected time slot, collecting packet-availability information for nodes located within a selected number of hops from the first node; (B) determining a subset of packets corresponding to the packet-availability information that is suitable for concurrent transmission in the selected time slot by considering, for the selected time slot, two or more of (i) zero-forcing, (ii) interference-alignment, and (iii) interference-cancellation; (C) identifying a set of transmitting nodes corresponding to the subset of packets; and (D) transmitting one or more trigger messages to said set of transmitting nodes to cause the concurrent transmission of the subset of packets in the selected time slot.

According to another embodiment, provided is a node for a wireless network, the wireless network being adapted for concurrent transmission of multiple radio-frequency signals between a plurality of transmitting and receiving nodes. The node is adapted to: (A) for a selected time slot, collect packet-availability information for nodes located within a selected number of hops from the first node; (B) determine a subset of packets corresponding to the packet-availability information that is suitable for concurrent transmission in the selected time slot by considering, for the selected time slot, two or more of (i) zero-forcing, (ii) interference-alignment, and (iii) interference-cancellation; (C) identify a set of transmitting nodes corresponding to the subset of packets; and (D) transmit one or more trigger messages to said set of transmitting nodes to cause the concurrent transmission of the subset of packets in the selected time slot.

BRIEF DESCRIPTION OF THE DRAWINGS

Other aspects, features, and benefits of various embodiments of the invention will become more fully apparent, by way of example, from the following detailed description and the accompanying drawings, in which.

DETAILED DESCRIPTION

Figure 1:
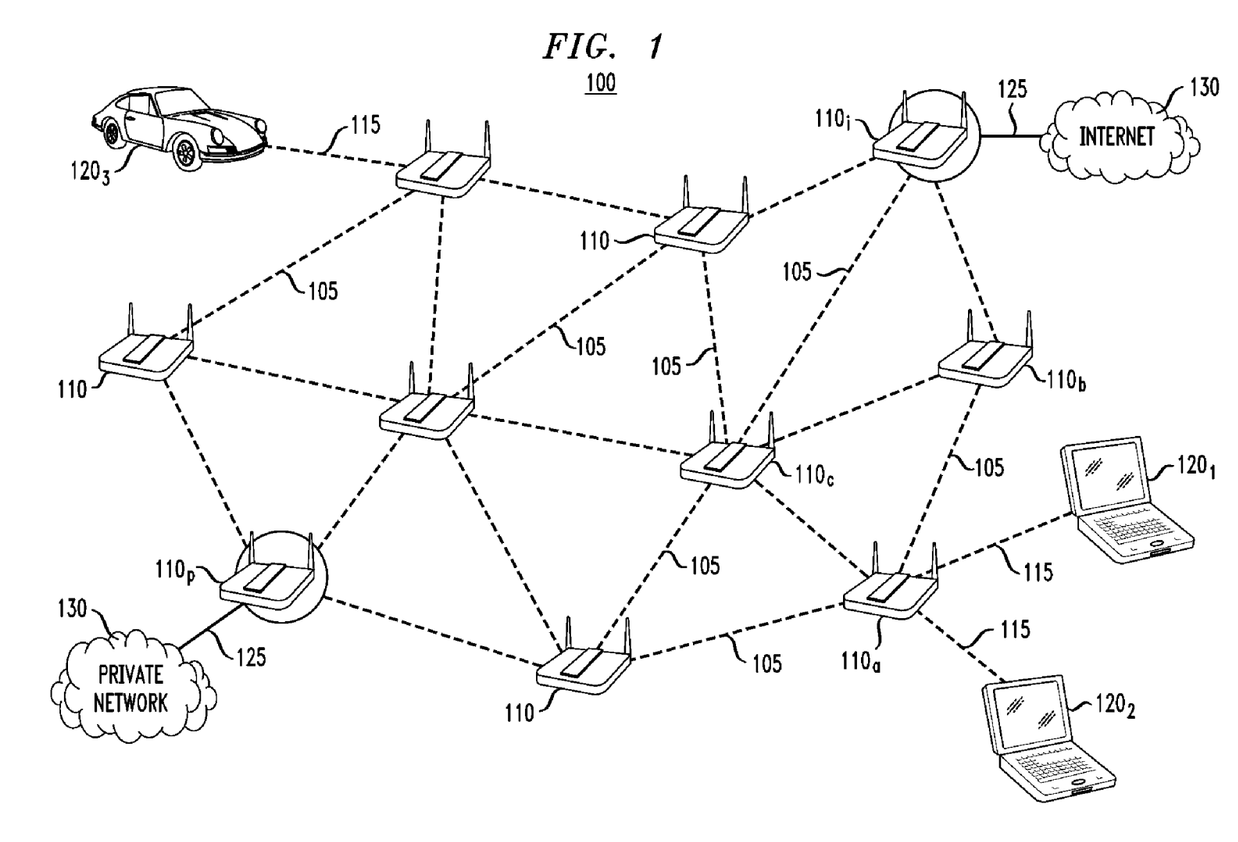
FIG. 1 shows a diagram of a representative wireless network, in which various embodiments of the invention can be practiced.

FIG. 1 shows a diagram of a representative wireless network 100, in which various embodiments of the invention can be practiced. Network 100 is a mesh network having a plurality of nodes 110. Each node 110 is adapted to perform several functions. For example, node 110 can serve as an access point (AP) for one or more mobile terminals (MTs), such as MTs $120_1$-$120_3$, present in the area. Each MT 120 can gain access to network 100 by establishing a wireless communication link 115 with a corresponding one of nodes 110 (usually the node providing the strongest reception). After gaining access to network 100, MT 120 becomes an end node of the network. Node 110 can further serve as a backhaul router that enables network 100 to relay communication signals, via wireless links 105, from node to node. Some of nodes 110, e.g., node $110_i$ and node $110_p$, can further serve as gateways that connect network 100, via respective wireline or wireless links 125, to an external network 130, e.g., the Internet or a private wireline network. The mesh topology of network 100 provides propagation-path diversity for substantially any communicating pair of nodes 110, meaning that there typically exist at least two different signal-propagation routes between those nodes.

If configured in accordance with an embodiment of the invention, network 100 is capable of supporting concurrent wireless transmissions between different nodes 110 and/or between nodes 110 and MTs 120. For example, in one embodiment, each node 110 runs an algorithm for identifying zero-forcing, interference-alignment, and/or interference-cancellation opportunities at receiving nodes. Various embodiments of the algorithm are described below in reference to FIGS. 2-4. Briefly, the algorithm might rely on one or more of (i) the node's knowledge of the local network topology, (ii) the node's knowledge of the channel state, and (iii) opportunistically received signals and/or packets to systematically identify and track opportunities for concurrent wireless transmissions in cooperation with neighbor nodes. Advantageously, the use of the identified opportunities enables network 100 to increase its throughput capacity by at least about 50%.

Illustrative Opportunities for Concurrent Wireless Transmissions

Figure 3:
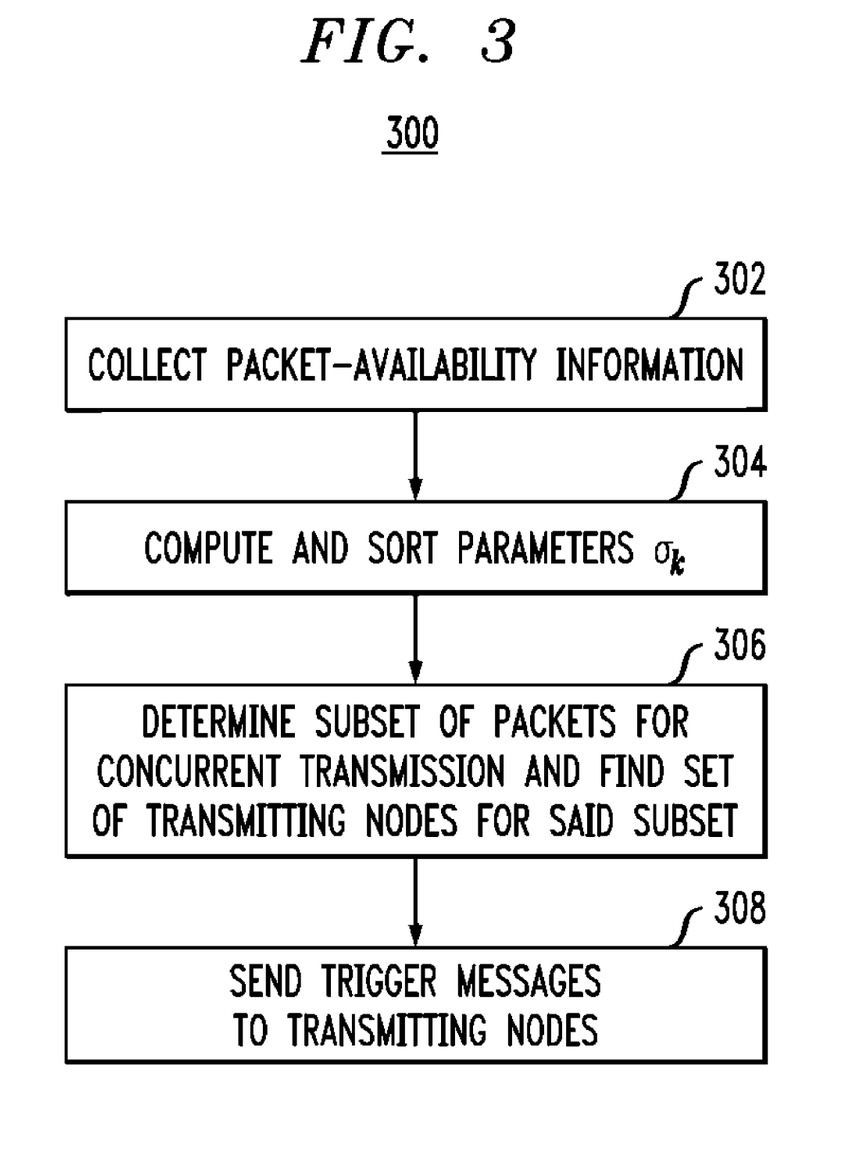
FIG. 3 shows a flowchart of a method for generating concurrent wireless transmissions that can be used in the network of FIG. 1 according to one embodiment of the invention.
Figure 4:
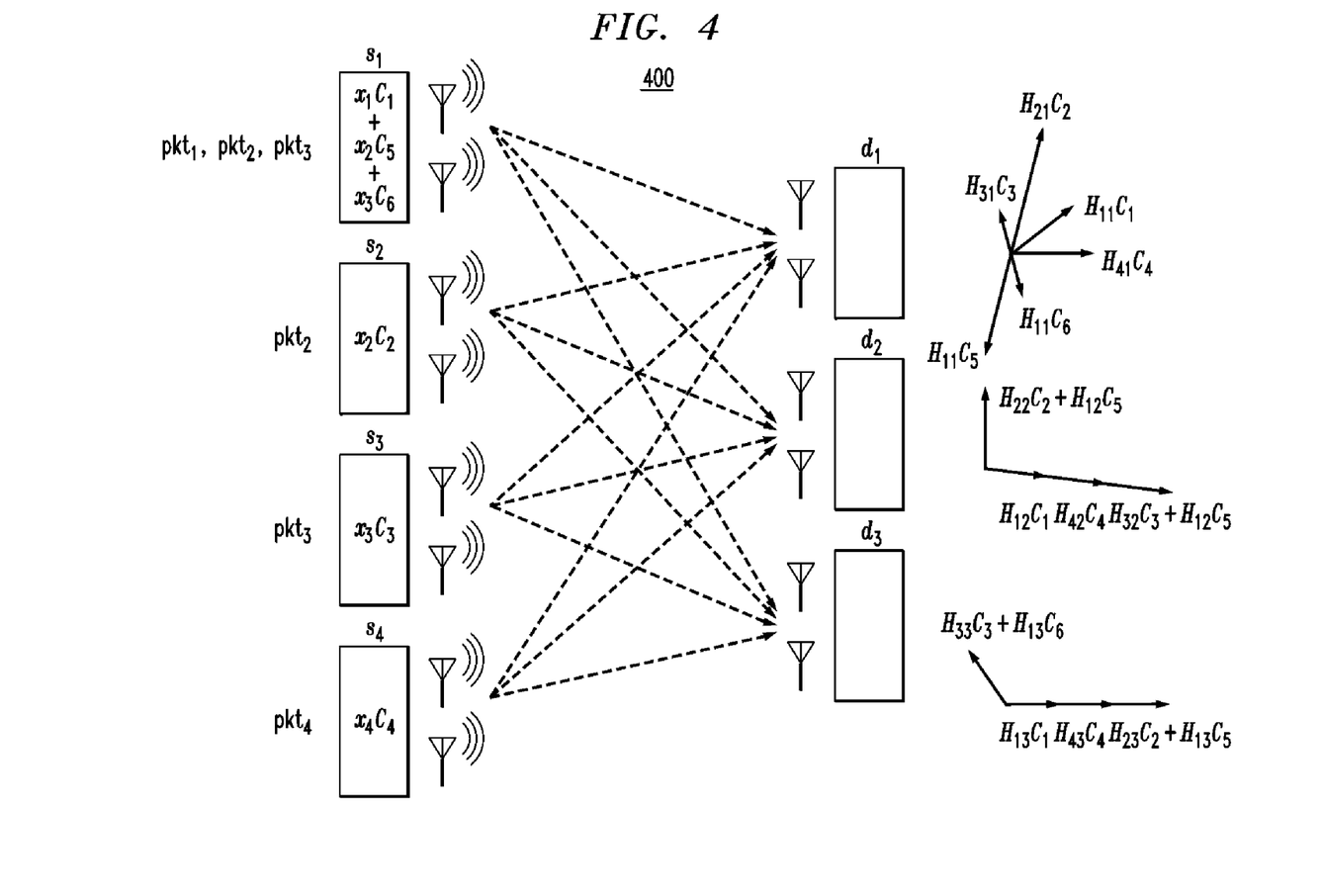
FIG. 4 illustrates an application of the method shown in FIG. 3 to a system having two degrees of freedom according to one embodiment of the invention.

FIGS. 2A-F illustrate representative opportunities for concurrent transmissions in a wireless network that is analogous to network 100 (FIG. 1). Various embodiments of the algorithm(s) described below in reference to FIGS. 3-4 are capable of systematically identifying some or all of the opportunities illustrated in FIGS. 2A-F.

The following nomenclature is adhered to in the description of FIGS. 2A-F:
- s is a sender node. Any of nodes 110 and MTs 120 can serve as node s;
- d is a destination node. Any of nodes 110 and MTs 120 can serve as node d, and there can be one or more destination nodes d for a given sender node s;
- u and v are intermediate nodes. Any of nodes 110 can serve as an intermediate node;
- $pkt_i$ is a data packet intended for transmission from sender node $s_i$ to destination node $d_i$; and
- $x_i$ is a radio-frequency (RF) signal that encodes and represents data packet $pkt_i$ in the physical (PHY) layer. Signal $x_i$ is also referred to as a "native" RF signal corresponding to packet $pkt_i$.

Each of nodes s, d, u, and v is assumed to have a single antenna. A straight solid line connecting two nodes in FIGS. 2A-F means that there is a transmission edge between those two nodes. Conversely, an absence of a straight solid line between two nodes means that there is no transmission edge between those two nodes. As used herein, the term "transmission edge" refers to the ability of two nodes to successfully exchange (send and/or receive) packets without relying on any intermediate nodes and without exceeding the maximum permitted RF power. The absence of a transmission edge between two nodes is usually caused by a large distance and/or unfavorable topography separating the nodes.

Figure 2A:
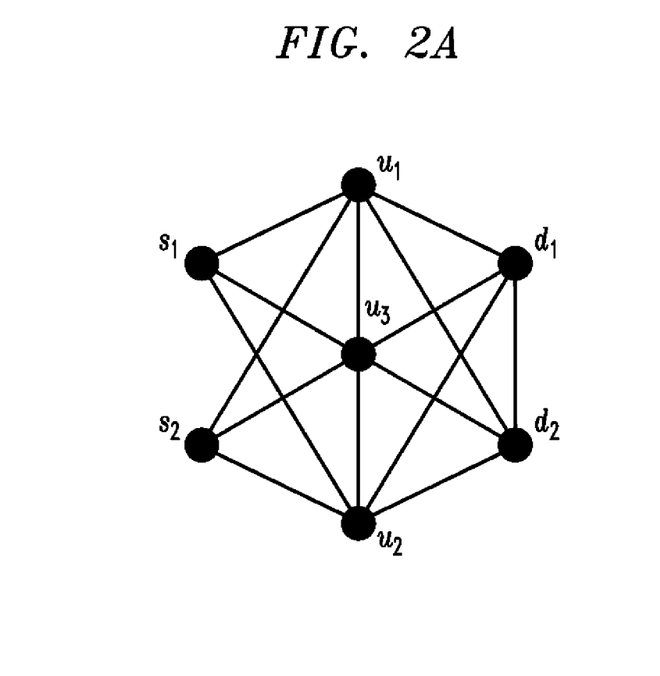
FIGS. 2A-F illustrate various opportunities for concurrent transmissions in a wireless network that is analogous to the network of FIG. 1.

Referring to FIG. 2A, without zero forcing, interference alignment, and/or interference cancellation, it takes a total of four time slots for packets $pkt_1$ and $pkt_2$ to reach their respective destinations (i.e., for packet $pkt_1$ to go from $s_1$ to $d_1$, and for packet $pkt_2$ to go from $s_2$ to $d_2$). More specifically, each of the four time slots is used for a one-hop unicast transmission of the corresponding one packet. For example, in time slot 1, packet $pkt_1$ is transmitted from $s_1$ to $u_1$; in time slot 2, packet $pkt_2$ is transmitted from $s_2$ to $u_2$; in time slot 3, packet $pkt_1$ is transmitted from $u_1$ to $d_1$; and, in time slot 4, packet $pkt_2$ is transmitted from $u_2$ to $d_2$.

Since node $u_3$ has transmission edges with each of the other aforementioned nodes, node $u_3$ can be used for zero forcing. For example, the following transmission scheme can be implemented. In time slot 1, packet $pkt_1$ is transmitted from node $s_1$ to node $u_1$. Since node $u_3$ has a transmission edge with node $s_1$, node $u_3$ overhears the transmission of $pkt_1$. In time slot 2, packet $pkt_2$ is transmitted from node $s_2$ to node $u_2$. Since node $u_3$ has a transmission edge with node $s_2$, node $u_3$ overhears the transmission of packet $pkt_2$. In time slot 3, nodes $u_1$ and $u_2$ concurrently transmit packets $pkt_1$ and $pkt_2$, respectively, to their respective destination nodes $d_1$ and $d_2$. At the same time, $u_3$ transmits a linear combination of signals $x_1$ and $x_2$, with the scaling coefficients in the linear combination selected so as to null the $x_2$ component at $d_1$ and the $x_1$ component at $d_2$. Due to the "help" from $u_3$, each of nodes $d_1$ and $d_2$ receives a scaled version of the wanted RF signal (i.e., $x_1$ and $x_2$, respectively) without interference from the unwanted signal and, hence, can decode the received RF signal using conventional decoding methods. As a result, packets $pkt_1$ and $pkt_2$ are delivered to their respective destinations in three time slots instead of four.

Figure 2B:
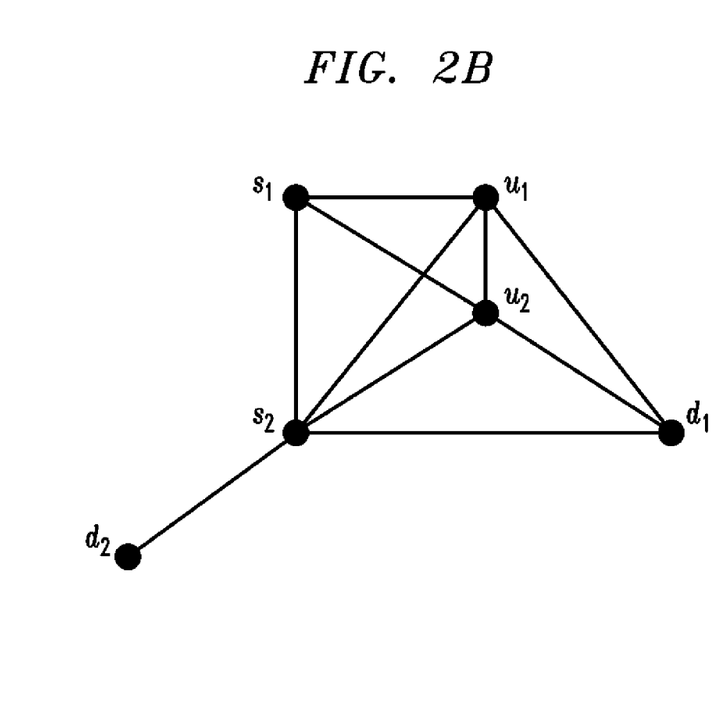

Referring to FIG. 2B, without zero forcing, interference alignment, and/or interference cancellation, it takes three time slots for packets $pkt_1$ and $pkt_2$ to reach their respective destinations. Each of the three time slots is used for a one-hop unicast transmission of the corresponding one packet. For example, in time slot 1, packet $pkt_1$ is transmitted from $s_1$ to $u_1$; in time slot 2, packet $pkt_2$ is transmitted from $s_2$ to $d_2$; and, in time slot 3, packet $pkt_1$ is transmitted from $u_1$ to $d_1$.

With an appropriate "help" from node $u_2$, the number of time slots can be reduced from three to two. For example, in time slot 1, nodes $s_1$ and $s_2$ can concurrently transmit packets $pkt_1$ and $pkt_2$, respectively. Since there is no transmission edge between $s_1$ and $d_2$, node $d_2$ receives signal $x_2$ without interference from signal $x_1$ and can decode the former using conventional methods. Due to the presence of transmission edges between nodes $s_1$, $s_2$, $u_1$, and $u_2$, each of nodes $u_1$ and $u_2$ receives, in time slot 1, a respective (different) linear combination of signals $x_1$ and $x_2$. Then, in time slot 2, nodes $u_1$ and $u_2$ appropriately scale the signals received in time slot 1 and concurrently transmit the resulting scaled signals. The scaling coefficients used by nodes $u_1$ and $u_2$ are selected so as to null the $x_2$ component at node $d_1$, which enables $d_1$ to recover packet $pkt_1$ from the received signal using conventional decoding methods.

Figure 2C:
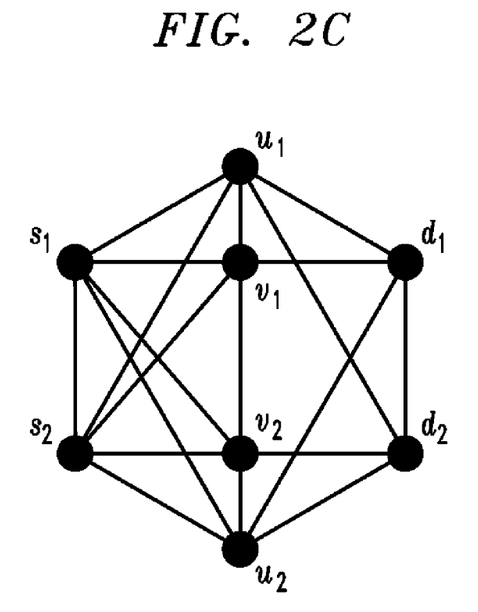

Referring to FIG. 2C, without zero forcing, interference alignment, and/or interference cancellation, it takes four time slots for packets $pkt_1$ and $pkt_2$ to reach their respective destinations. Each of the four time slots is used for a one-hop unicast transmission of the corresponding one packet. For example, in time slot 1, packet $pkt_1$ is transmitted from $s_1$ to $u_1$; in time slot 2, packet $pkt_2$ is transmitted from $s_2$ to $u_2$; in time slot 3, packet $pkt_1$ is transmitted from $u_1$ to $d_1$; and, in time slot 4, packet $pkt_2$ is transmitted from $u_2$ to $d_2$.

With an appropriate "help" from nodes $v_1$ and $v_2$, the number of time slots can be reduced from four to two. For example, in time slot 1, nodes $s_1$ and $s_2$ can concurrently transmit packets $pkt_1$ and $pkt_2$, respectively. Due to the presence of transmission edges between nodes $s_1$, $s_2$, $u_1$, $u_2$, $v_1$, and $v_2$, the four intermediate nodes (i.e., $u_1$, $u_2$, $v_1$, and $v_2$) receive, in time slot 1, four respective (different) linear combinations of signals $x_1$ and $x_2$. Then, in time slot 2, intermediate nodes $u_1$, $u_2$, $v_1$, and $v_2$ appropriately scale their respective signals received in time slot 1 and concurrently transmit the resulting scaled signals. Without the "help" from intermediate nodes $v_1$ and $v_2$, each of destination nodes $d_1$ and $d_2$ would have received, in time slot 2, a respective linear combination of signals $x_1$ and $x_2$ that might not have been decodable. However, with the "help" from intermediate nodes $v_1$ and $v_2$, each of destination nodes $d_1$ and $d_2$ receives a scaled version of the respective wanted signal (i.e., $x_1$ and $x_2$, respectively) without interference from the respective unwanted one. More specifically, intermediate node $v_1$ uses a scaling coefficient that causes the $x_2$ component to be nulled at node $d_1$ while the $x_1$ component is being presented in a decodable form. Similarly, intermediate node $v_2$ uses a scaling coefficient that causes the $x_1$ component to be nulled at node $d_2$ while the $x_2$ component is being presented in a decodable form.

Figure 2D:
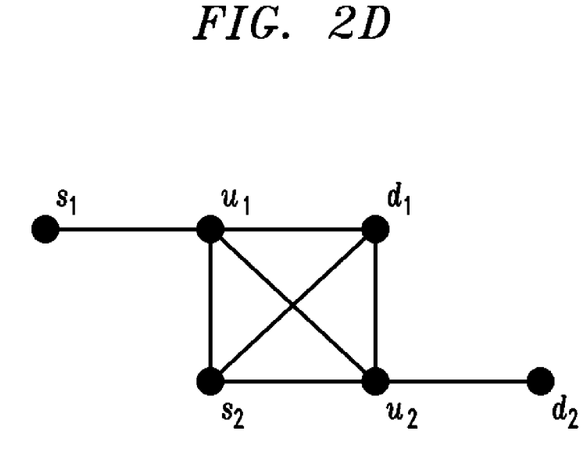

Referring to FIG. 2D, without zero forcing, interference alignment, and/or interference cancellation, it takes four time slots for packets $pkt_1$ and $pkt_2$ to reach their respective destinations. Each of the four time slots is used for a one-hop unicast transmission of the corresponding one packet. For example, in time slot 1, packet $pkt_1$ is transmitted from $s_1$ to $u_1$; in time slot 2, packet $pkt_2$ is transmitted from $s_2$ to $u_2$; in time slot 3, packet $pkt_1$ is transmitted from $u_1$ to $d_1$; and, in time slot 4, packet $pkt_2$ is transmitted from $u_2$ to $d_2$.

With interference cancellation, the following transmission scheme can be implemented. In time slot 1, nodes $s_1$ and $s_2$ concurrently transmit packets $pkt_1$ and $pkt_2$, respectively. Because node $u_1$ has transmission edges with both nodes $s_1$ and $s_2$, node $u_1$ receives, in time slot 1, a linear combination of signals $x_1$ and $x_2$. In contrast, each of nodes $d_1$ and $u_2$ receives only signal $x_2$. In time slot 2, nodes $u_1$ and $u_2$ concurrently retransmit their respective signals without any particular scaling or encoding. Because node $d_2$ has a transmission edge only with node $u_2$, node $d_1$ receives, in time slot 2, the wanted signal $x_2$ without interference from the unwanted signal $x_1$. In contrast, node $d_1$ has transmission edges with both intermediate nodes $u_1$ and $u_2$ and, therefore, receives, in time slot 2, a linear combination of signals $x_1$ and $x_2$. However, node $d_1$ already "knows" signal $x_2$ because it was received earlier, in time slot 1. Therefore, node $d_1$ can use this knowledge to remove (cancel) the $x_2$ component from the mixed signal received in time slot 2, thereby obtaining signal $x_1$ in a decodable form.

To implement the above-outlined transmission scheme, node $u_1$ can serve as a coordinating node that transmits a corresponding triggering message. The triggering message is transmitted prior to time slot 1 and instructs nodes $s_1$ and $s_2$ to concurrently transmit signals $x_1$ and $x_2$ during time slot 1. The triggering message also instructs node $u_2$ to transmit immediately thereafter concurrently with node $u_1$ and informs node $d_1$ of its decoding vector. In one embodiment, the triggering message can be a MAC (medium access control)-layer message that is piggybacked onto an earlier packet transmitted by node $u_1$. Assuming that the triggering message does not require a dedicated time slot, the above-outlined transmission scheme reduces the number of time slots from four to two.

Figure 2E:
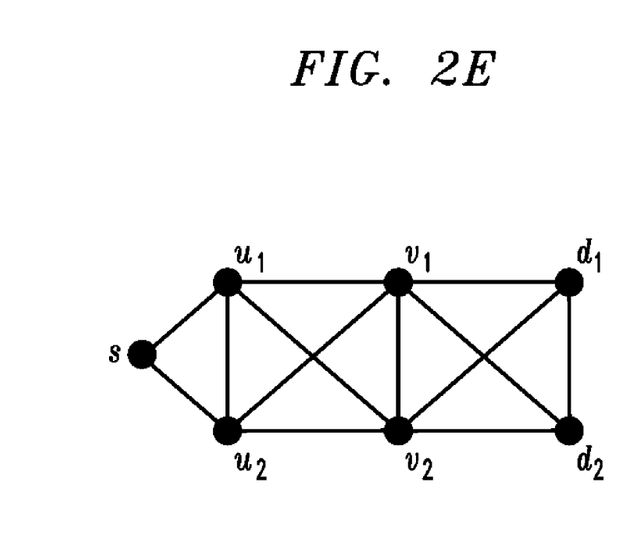

Referring to FIG. 2E, node s is the sender node for both packets $pkt_1$ and $pkt_2$. Without zero forcing, interference alignment, and/or interference cancellation, it takes six time slots for packets $pkt_1$ and $pkt_2$ to reach their respective destinations. Each of the six time slots is used for a one-hop unicast transmission of the corresponding one packet. For example, in time slot 1, packet $pkt_1$ is transmitted from s to $u_1$; in time slot 2, packet $pkt_2$ is transmitted from s to $u_2$; in time slot 3, packet $pkt_1$ is transmitted from $u_1$ to $v_1$; in time slot 4, packet $pkt_2$ is transmitted from $u_2$ to $v_2$; in time slot 5, packet $pkt_1$ is transmitted from $v_1$ to $d_1$; and, in time slot 6, packet $pkt_2$ is transmitted from $v_2$ to $d_2$.

With zero forcing, the following transmission scheme can be implemented by the nodes of FIG. 2E. In time slot 1, packet $pkt_1$ is transmitted from s to $u_1$. In time slot 2, packet $pkt_2$ is transmitted from s to $u_2$. In time slot 3, nodes $u_1$ and $u_2$ concurrently transmit respective linear combinations of signals $x_1$ and $x_2$ to nodes $v_1$ and $v_2$. In time slot 4, nodes $v_1$ and $v_2$ amplify their respective received signals using the same gain and concurrently transmit the resulting amplified signals to nodes $d_1$ and $d_2$.

Let us denote the channel-state matrix for the transmission channel between nodes $u_1$, $u_2$ and $v_1$, $v_2$ as $H_1$ and the channel-state matrix for the transmission channel between nodes $v_1$, $v_2$ and $d_1$, $d_2$ as $H_2$. Let us further denote the encoding vector used in time slot 3 at node $u_i$ as $\omega_i$, where $i=1, 2$, wherein the encoding vector has two components, each being the weighting coefficient that is used to scale the corresponding one of signals $x_1$ and $x_2$ to produce the transmitted linear combination of signals $x_1$ and $x_2$. Suppose now that nodes $u_1$ and $u_2$ are configured to use encoding vectors $\omega_1$ and $\omega_2$ that satisfy Eq. (1):

$$[\omega_1 \omega_2]^T = (H_1 H_2)^{-1} \qquad (1)$$

where superscript T means transposed. Then, it can be shown that signals $y_1$ and $y_2$ received in time slot 4 by nodes $d_1$ and $d_2$, respectively, satisfy Eq. (2):

$$[y_1 y_2]^T = \Gamma [x_1 x_2]^T \qquad (2)$$

where $\Gamma$ is a diagonal matrix (e.g., a square matrix in which the entries outside the main diagonal are all zero). Eq. (2) means that nodes $d_1$ and $d_2$ can recover packets $pkt_1$ and $pkt_2$ from received signals $y_1$ and $y_2$, respectively, using conventional decoding methods. As a result, the above-outlined transmission scheme reduces the number of time slots from six to four.

Figure 2F:
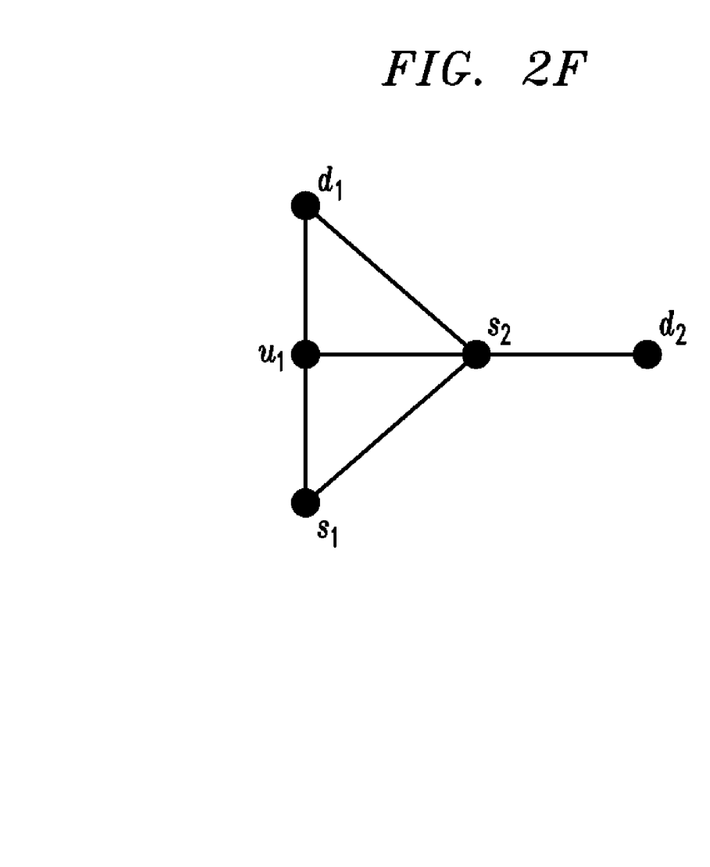

Referring to FIG. 2F, let us suppose that the network routes packet $pkt_1$ from node $s_1$ to node $d_1$ via node $s_2$, while packet $pkt_2$ is routed from node $s_2$ to node $d_2$. Then, without zero forcing, interference alignment, and/or interference cancellation, it takes three time slots for packets $pkt_1$ and $pkt_2$ to reach their respective destinations. Each of the three time slots is used for a one-hop unicast transmission of the corresponding one packet. For example, in time slot 1, packet $pkt_1$ is transmitted from $s_1$ to $s_2$; in time slot 2, packet $pkt_2$ is transmitted from $s_2$ to $d_2$; and, in time slot 3, packet $pkt_1$ is transmitted from $s_2$ to $d_1$. In this transmission scheme, node $s_2$ is functioning as both a source node and an intermediate node.

However, if packet $pkt_1$ is rerouted via node $u_1$, then interference cancellation can be used to reduce the number of time slots from three to two. More specifically, in time slot 1, nodes $s_1$ and $s_2$ can transmit concurrently. Due to the shown configuration of transmission edges, both nodes $d_1$ and $d_2$ will receive signal $x_2$ without interference from signal $x_1$. In contrast, node $u_1$ will receive a mixed signal having both $x_1$ and $x_2$ signal components. In time slot 2, node $u_1$ amplifies the received mixed signal and transmits the resulting amplified signal to node $d_1$. Upon receipt of the mixed signal in time slot 2, node $d_1$ uses its knowledge of signal $x_2$ acquired in time slot 1 to remove the $x_2$ component from the mixed signal, thereby obtaining signal $x_1$ in a decodable form.

In summary, FIGS. 2A-F exemplify the following opportunities for concurrent wireless transmissions. FIGS. 2A-C show that one or more helper nodes can be invoked to take advantage of zero-forcing and/or interference-cancellation techniques for relaying packets from sender nodes to destination nodes in fewer time slots than without such techniques. As used herein, the term "helper node" refers to a node whose participation in packet transmission is not required or necessary for delivering a packet from a sender node to a destination node under a conventional unicast-transmission scheme, but whose participation in packet transmission enables zero forcing and/or interference cancellation to be performed. FIG. 2A shows an opportunity for concurrent wireless transmissions, in which a helper node had opportunistically received (overheard) native RF signals. FIGS. 2B-C show opportunities for concurrent wireless transmissions, in which a helper node had opportunistically received mixed RF signals, e.g., RF signals corresponding to linear combinations of native RF signals. FIG. 2D shows an opportunity for concurrent wireless transmissions, in which no helper nodes are invoked but one or more of the participating nodes take advantage of opportunistically received RF signals resulting from a favorable local transmission-edge configuration. FIG. 2E shows an opportunity for concurrent wireless transmissions, in which the participating intermediate nodes located two hops away from the destination nodes use channel-state information to generate appropriate mixed signals whose retransmission by the downstream nodes effectively nulls signal interference at the destination nodes. FIG. 2F shows an opportunity for concurrent wireless transmissions, in which one of the signals is rerouted to enable the use of an opportunistically received signal for interference cancellation.

Identification of Opportunities for Concurrent Wireless Transmissions

Each of the algorithms (methods) described in this subsection is designed for implementation at a node of a wireless network, such as node 110 of network 100. All or only some of the nodes in the network might run a selected algorithm, with different nodes running separate independent copies (instances) of the algorithm. Unless explicitly stated otherwise, the description below assumes that all nodes use the same fixed transmission rate. One skilled in the art will appreciate that the described fixed-rate algorithms can be extended in a relatively straightforward manner to a configuration in which multiple transmission rates are permitted.

The algorithms described herein rely on one or more of (i) opportunistically received, native or mixed RF signals, (ii) local transmission graph G, (iii) local interference graph $G_I$, (iv) estimates of local channel-state matrix H, and (v) network-layer traffic-flow information. Sizes of the graphs and the rank of the channel-state matrix can be limited, e.g., by taking into consideration only the network neighborhood within a specified number of hops (e.g., two hops) from the node implementing the algorithm. FIGS. 2A-F are examples of local transmission graphs.

The description of FIGS. 2A-F in the preceding subsection implicitly assumes that the transmission and interference graphs are the same. In a more-general case, transmission and interference graphs might differ from one another because the signal threshold used for the detection of interference is different from the signal threshold used for the determination of whether or not two nodes have a transmission edge between them. A node can compose its transmission and interference graphs based, e.g., on a rolling-call procedure, during which different nodes take turns broadcasting a calibration signal while the non-transmitting nodes are "listening" and comparing the respective received signals with appropriate signal thresholds. Representative procedures for estimating channel-state matrix H are disclosed, e.g., in U.S. Pat. Nos. 7,653,142, 7,647,073, and 7,623,561, all of which are incorporated herein by reference in their entirety.

The number of independent signals that can concurrently be transmitted by a single transmitting node (e.g., node 110, FIG. 1) is referred to as the DOF (degree of freedom) number. In general, if a transmitter has multiple antennas, then each of those antennas corresponds to at least one degree of freedom. Each independent transmission frequency is also counted as a degree of freedom. For example, IEEE 802.11a/g stipulates the use of 48 sub-carriers, each of which can be counted as a degree of freedom. If a transmitter has M antennas and uses Q sub-carriers, then that transmitter has M×Q degrees of freedom. For clarity, the algorithms described herein are discussed in reference to DOF=1 or 2. One skilled in the art will appreciate that these algorithms can be extended in a relatively straightforward manner to any other DOF number.

Cooperation of multiple nodes in producing concurrent transmissions can be enabled by MAC-layer signaling. For example, when a node identifies one or more opportunities for concurrent wireless transmissions, it can trigger these concurrent transmissions by sending appropriate information about the identified opportunities to its neighbor nodes. This information can be piggybacked, e.g., on conventional ACK (acknowledgement) or DATA packets.

FIG. 3 shows a flowchart of a method 300 for generating concurrent wireless transmissions that can be used in network 100 (FIG. 1) according to one embodiment of the invention. For illustration purposes, method 300 is first described for DOF=1. Application of method 300 to a representative case of DOF=2 is given below in reference to FIG. 4. For each time slot, the corresponding set of transmitting nodes is assumed to be non-overlapping with the corresponding set of receiving nodes, i.e., a node is assumed to be able to transmit or receive, but not both at the same time.

At step 302, the node running method 300 collects packet-availability information for the nodes located in its neighborhood. In one embodiment, the node arranges the collected packet-availability information in form of a packet-availability matrix A. Each matrix element $a_{ik}$ of matrix A is either 1 or 0. More specifically, if the i-th node from local transmission graph G has the k-th packet, then $a_{ik}=1$, where i is the node ID and k is the packet ID. If the i-th transmitting node does not have the k-th packet, then $a_{ik}=0$. Packet-availability information in general and packet-availability matrix A in particular can be compiled, e.g., based on network-layer routing information and opportunistically overheard transmissions that occurred in previous time slots in the node's neighborhood. One skilled in the art will appreciate that the content of packet-availability matrix A depends on the time slot intended for the concurrent transmission and changes over time. Provided that local transmission graph G is unchanged, the overall format of packet-availability matrix A remains unchanged as well.

For example, for the local transmission graph shown in FIG. 2A, a fragment $A_f$ of packet-availability matrix A corresponding to time slot 3 is given by Eq. (3):

$$A_f = \begin{bmatrix} 1 & 0 \\ 0 & 1 \\ 1 & 1 \end{bmatrix} \quad (3)$$

The first column of fragment $A_f$ expresses the fact that nodes $u_1$ and $u_3$ have packet $pkt_1$ at the beginning of time slot 3. The second column of fragment $A_f$ expresses the fact that nodes $u_2$ and $u_3$ have packet $pkt_2$ at the beginning of time slot 3.

At step 304, for each k, the node running method 300 computes a set of parameters $\sigma_k$. The physical meaning of an individual parameter $\sigma_k$ is the maximum number of receiving nodes that can receive their intended packets even if packet $pkt_k$ is transmitted during the same time slot. An algorithm used for the calculation of parameter $\sigma_k$ depends on whether or not the knowledge of channel-state matrix H is complete. If the knowledge is complete, then all matrix elements of channel-state matrix H are known. If the knowledge of H is incomplete, then one or more matrix elements of channel-state matrix H are not known. Computation of parameter $\sigma_k$ when some matrix elements of channel-state matrix H are not known is provided below after the description of FIG. 4.

If the knowledge of channel-state matrix H is complete, then the set of parameters $\sigma_k$ is computed by summing up matrix elements $a_{ik}$ corresponding to each particular k. For fragment $A_f$ given by Eq. (3), summation performed over each of the two columns produces $\sigma_1=\sigma_2=2$. In a more-general case, parameters $\sigma_k$ corresponding to different k's might be different. The computed parameters $\sigma_k$ are sorted in an ascending magnitude order so that $\sigma_{k1} \leqq \sigma_{k2} \leqq \ldots \leqq \sigma_{k_K}$, where K is the total number of packets considered for concurrent transmission; $k_1$ is the packet ID for the packet with the smallest $\sigma$ value; $k_2$ is the packet ID for the packet with the second smallest $\sigma$ value; etc.

At step 306, the node running method 300 analyzes the local transmission graph to determine the largest subset of packets from the K packets corresponding to packet-availability matrix A that can satisfy the following condition: if N is the size of the subset, then, for each packet in the subset, there are at least N nodes that have the packet and are able to transmit the packet to the intended receiving node(s). For example, if there are K=10 packets and N=4, then this means that, for each of N=4 packets (out of the total of K=10 packets), there are at least N=4 nodes that have the packet and can transmit the packet to the corresponding intended receiving node(s). This condition ensures that there is a sufficient number of transmitting nodes, each having appropriate transmission edges, so that, collectively, the transmitting nodes can align and/or zero-force the unwanted signal components at each receiving node. In mathematical terms, this condition means that there is a sufficient number of independent linear equations that mix different transmitted signals so that the weighting coefficients in those equations can be selected to present, to each intended receiver, the corresponding wanted signal in a decodable form.

If the identified largest subset of packets can be transmitted using more than one combination (set) of transmitting nodes, then those combinations of transmitting nodes are further analyzed to identify among them an optimal combination of transmitting nodes. In one embodiment, an optimal combination is a node set that has a minimum possible number of transmitting nodes. In other embodiments, other suitable criteria might be used to determine which combination of transmitting nodes is "optimal."

The following piece of pseudo-code provides a first exemplary implementation of step 306.

---

306-1: Let PKT be a set of packets to be transmitted, and |PKT| be the number of packets in PKT;
306-2: Let p=1;
306-3: While |PKT| > $\sigma_{k_p}$, where $\sigma_{k_p}$ is the corresponding one of ordered parameters $\sigma_k$:
    PKT = PKT − {pkt$_{k_p}$};
    p=p+1;
End while;
306-4: Let U* be a full set of transmitting nodes corresponding to PKT;
306-5: Let U be a subset of U*;
306-6: For any transmitting node $u_i \in U^* - U$ ;
    if $u_i$ is removed from U*, then each pkt $\in$ PKT still has at least |PKT| available transmitting nodes;
    U* = U* − {$u_i$};
End for.

---

Sub-steps 306-1-306-3 identify the above-defined largest subset of packets within the set of packets corresponding to packet-availability matrix A. Sub-steps 306-4-306-6 identify the above-defined optimal set of transmitting nodes.

At step 308, the node running method 300 transmits trigger messages to the nodes of the optimal set of transmitting nodes identified at step 306. In one embodiment, a trigger message lists all nodes of the optimal set to enable each of said nodes to determine appropriate weighting coefficients for the transmitted native or mixed signals (also see the description of encoding vector $\omega_i$ given in reference to Eqs. (1)-(2)). Upon receipt of the trigger messages, the nodes of the optimal set of transmitting nodes encode signals using the determined weighting coefficients and concurrently transmit the resulting encoded signals. If a node receives two or more conflicting trigger messages, then conventional conflict-resolution techniques can be used to select one of the trigger messages for action and discard the remaining ones. For example, a trigger message that, if acted upon, results in a concurrent transmission of the largest number of packets might be selected for action. Two trigger messages are conflicting with one another if they identify a node as a transmitting node for the same time slot, but for different concurrent transmission schemes.

FIG. 4 illustrates an application of method 300 to a case of DOF=2 according to one embodiment of the invention. More specifically, FIG. 4 shows a subset 400 of seven nodes, each having two antennas (hence, DOF=2). There are four transmitting nodes labeled $s_1$-$s_4$ and three receiving nodes labeled $d_1$-$d_3$. Transmission edges between the transmitting and receiving nodes are shown by the dotted lines. Transmitting nodes $s_1$-$s_4$ have packets $pkt_1$-$pkt_4$, respectively. In addition, node $s_1$ has packets $pkt_2$ and $pkt_3$, which it had previously opportunistically received. The destination nodes for packets $pkt_1$-$pkt_4$ are nodes $d_1$, $d_2$, $d_3$, and $d_1$, respectively.

Since each node has two antennas, each transmitted signal and each received signal is a vector in the antenna space, with the first vector component corresponding to the first antenna of the transmitting/receiving node and the second vector component corresponding to the second antenna of the transmitting/receiving node. For example, any node s can transmit native signal x as vector X expressed by Eq. (4):

$$X = Cx \equiv \begin{bmatrix} c_a \\ c_b \end{bmatrix} x \qquad (4)$$

where C is the antenna partition vector for the specific packet encoded in native signal x, whose first component ($c_a$) is the scaling factor with which signal x is applied to the first antenna of node s, and whose second component ($c_b$) is the scaling factor with which signal x is applied to the second antenna of node s. Similarly, any signal Y received by node d is a vector signal expressed by Eq. (5):

$$Y = \begin{bmatrix} y_a \\ y_b \end{bmatrix} \qquad (5)$$

where the first component ($y_a$) of signal Y is the signal received through the first antenna of node d, and the second component ($y_b$) of signal Y is the signal received through the second antenna of node d.

Packet-availability matrix A corresponding to FIG. 4 is given by Eq. (6):

$$A = \begin{bmatrix} 1 & 1 & 1 & 0 \\ 0 & 1 & 0 & 0 \\ 0 & 0 & 1 & 0 \\ 0 & 0 & 0 & 1 \end{bmatrix} \qquad (6)$$

Analysis of this packet-availability matrix and of the local transmission graph in accordance with sub-steps 306-1-

306-6 of method 300 reveals that all four packets can be transmitted concurrently in a single time slot as follows. Node $s_1$ transmits a linear combination of signals $x_1$, $x_2$, and $x_3$ using antenna partition vectors $C_1$, $C_5$, and $C_6$, respectively. Node $s_2$ transmits signal $x_2$ using antenna partition vector $C_2$. Node $s_3$ transmits signal $x_3$ using antenna partition vector $C_3$. Node $s_4$ transmits signal $x_4$ using antenna partition vector $C_4$.

Assuming, for clarity, that channel-state matrix H is antenna-independent and denoting the matrix element of H corresponding to the wireless channel between the i-th transmitting node and the j-th receiving node as $H_{ij}$, one arrives at the following expression for signals $Y_1$, $Y_2$, and $Y_3$ received by nodes $d_1$, $d_2$, and $d_3$, respectively:

$$\begin{bmatrix} Y_1 \\ Y_2 \\ Y_3 \end{bmatrix} = \begin{bmatrix} H_{11}C_1 & H_{41}C_4 & H_{21}C_2 + H_{11}C_5 & H_{31}C_3 + H_{11}C_6 \\ H_{12}C_1 & H_{42}C_4 & H_{22}C_2 + H_{12}C_5 & H_{32}C_3 + H_{12}C_6 \\ H_{13}C_1 & H_{43}C_4 & H_{23}C_2 + H_{13}C_5 & H_{33}C_3 + H_{13}C_6 \end{bmatrix} \begin{bmatrix} x_1 \\ x_4 \\ x_2 \\ x_3 \end{bmatrix} \quad (7)$$

If antenna partition vectors $C_1$ through $C_6$ are selected to satisfy Eqs. (8a-8d):

$$H_{21}C_2 + H_{11}C_5 = 0 \quad (8a)$$

$$H_{31}C_3 + H_{11}C_6 = 0 \quad (8b)$$

$$H_{12}C_1 = H_{42}C_4 = H_{32}C_3 + H_{12}C_6 \quad (8c)$$

$$H_{13}C_1 = H_{43}C_4 = H_{23}C_2 + H_{13}C_5 \quad (8d)$$

then the following is true.

The contributions of unwanted native signals $x_2$ and $x_3$ into signal $Y_1$ are zero-forced as indicated by the vector diagram shown in FIG. 4 next to node $d_1$. Node $d_1$ can decode each of wanted native signals $x_1$ and $x_4$, e.g., by projecting, in the antenna space, one of these signals onto the axis orthogonal to the other signal. In mathematical terms, the two antennas of node $d_1$ provide a system of two independent linear equations for wanted native signals $x_1$ and $x_4$, which can be solved to determine both of these native signals.

The contributions of unwanted native signals $x_1$, $x_3$, and $x_4$ into signal $Y_2$ are aligned with one another as indicated by the vector diagram shown in FIG. 4 next to node $d_2$. Node $d_2$ can decode wanted native signal $x_2$, e.g., by projecting that signal, in the antenna space, onto the axis orthogonal to the aligned signals. In mathematical terms, the two antennas of node $d_2$ provide a system of two independent linear equations for wanted native signal $x_2$ and the combined aligned signal, which can be solved to determine native signal $x_2$.

The contributions of unwanted native signals $x_1$, $x_2$, and $x_4$ into signal $Y_3$ are aligned with one another as indicated by the vector diagram shown in FIG. 4 next to node $d_3$. Node $d_3$ can decode wanted native signal $x_3$, e.g., by projecting that signal, in the antenna space, onto the axis orthogonal to the aligned signals. In mathematical terms, the two antennas of node $d_3$ provide a system of two independent linear equations for wanted native signal $x_3$ and the combined aligned signal, which can be solved to determine native signal $x_3$.

In general, at step 306, method 300 determines suitable weighting coefficients and/or antenna partition vectors for the nodes of the identified optimal combination of transmitting nodes by attempting, for each receiving node, to either zero-force or align the contributions of unwanted signals into the received signal. If side information is available at some or all of the receiving nodes, then method 300 can determine suitable weighting coefficients and antenna partition vectors by additionally considering interference cancellation as an available technique for recovering wanted native signals. As used herein, the term "side information" refers to a prior opportunistic knowledge, by a receiving node, of packets and/or signals that are being transmitted in the present time slot. The description of FIG. 2D in the preceding subsection provides a representative example of how side information might be acquired.

One skilled in the art will appreciate that weighting coefficients and antenna partition vectors can similarly be determined when channel-state matrix H is antenna dependent. Such antenna dependency will manifest itself as an increase in the number of matrix elements in H. For example, the state of the wireless channel between two two-antenna nodes will be described by four matrix elements in an antenna-dependent case, as opposed to only one matrix element in an antenna-independent case.

Referring back to FIG. 3 and step 304 of method 300, we now describe how parameter $\sigma_k$ is computed when the knowledge of channel-state matrix H is incomplete. With some matrix elements of H missing, some putative transmitters of packet $pkt_k$ will be unable to determine proper weighting coefficients and/or antenna-partition vectors, e.g., in a manner similar to that described above in reference to Eqs. (7)-(8). As a consequence, these transmitters need to be excluded from consideration for participation in concurrent transmissions.

To calculate the set of parameters $\sigma_k$ at step 304 of method 300, the node first identifies, for each k, a maximum matching between the set of transmitting nodes having packet $pkt_k$ and the set of receiving nodes, with the intended destination of packet $pkt_k$ (e.g., in FIG. 4, node $d_1$ for packet $pkt_1$, node $d_2$ for packet $pkt_2$, etc.) being present in the maximum matching. Hereafter, the size of the identified maximum matching is denoted as $m_k$.

As known from the graph theory, a matching in a graph is a set of edges that do not have common vertices. More specifically, for graph G=(V,E), where V is a set of vertices and E is a set of edges, a matching is a set of pairwise non-adjacent edges, wherein the term "non-adjacent" means that no two edges share a common vertex. A maximum matching is a matching that contains the largest possible number of edges. For a given graph G, there might be more than one maximum matching. A maximum matching should not be confused with a maximal matching. The latter is defined as a matching having the following property: if any edge that is not in the maximal matching is added to it from the graph, then the resulting set of edges is no longer a matching. While every maximum matching is also a maximal matching, the reverse is not true, i.e., not every maximal matching is a maximum matching.

Next, for each k, the node finds a set of receiving nodes having the following property. For each receiving node in the set, the transmitting nodes from the identified maximum matching do not cause signal interference. Hereafter, the size of the identified set of receiving nodes is denoted as $l_k$.

Finally, the set of parameters $\sigma_k$ is computed using Eq. (9):

$$\sigma_k = m_k + l_k \quad (9)$$

As an example, if a transmitting node of packet $pkt_k$ does not create interference at any receiver and no other transmitting node has packet $pkt_k$, then $m_k=1$ and $l_k=K-1$, where K is the total number of packets considered for concurrent transmission. As with the previously described alternative algorithm for $\sigma_k$, the computed values of $\sigma_k$ are sorted in an ascending magnitude order so that $\sigma_{k1} \leq \sigma_{k2} \leq \ldots \leq \sigma_{k_K}$.

The following piece of pseudo-code provides an exemplary combined implementation of steps 304/306 for method 300.

| | |
|---|---|
| (304/306)-1: | Let PKT be a set of packets to be transmitted, and \|PKT\| be the number of packets in PKT; |
| (304/306)-2: | Add a pseudo-sender for any packet pkt ∈ PKT that a receiver already has; |
| (304/306)-3: | While CanNotXmitS(PKT, ρ) is true, where ρ is the transmission rate;<br>    $\sigma_k$=MaxNonIntR(PKT, k), ∀k = 1,2,...\|PKT\|;<br>    Let pkt be a packet with minimal<br>    {$\sigma_k$\|k = 1,2,...\|PKT\|};<br>    PKT = PKT − {pkt};<br>End while; |
| (304/306)-4: | Prune senders one by one while CanNotXmitS(PKT, ρ) is false. |

Note that this pseudo-code is compatible with multiple transmission rates because it explicitly includes transmission rate ρ as one of the parameters. Function MaxNonIntR(PKT, k) returns $\sigma_k$ calculated using Eq. (9). Sub-step (304/306)-2 takes into account available side information. If a node has packet pkt ∈ PKT and there is a suitable transmission edge, then the node can serve as a pseudo-sender. If the final solution has a pseudo-sender, then that pseudo-sender becomes one of the transmitting nodes. Sub-step (304/306)-4 finds an optimal set of transmitting nodes having a minimum possible number of transmitting nodes.

Function CanNotXmitS(PKT, ρ) used in sub-steps (304/306)-3 and (304/306)-4 provides an answer to the question of whether set PKT can be transmitted concurrently at a given transmission rate ρ. When the set cannot be transmitted, the function returns a Boolean "true." When the set can be transmitted, the function returns a Boolean "false."

Let us denote as Φ the coding coefficient matrix, which is defined by Eq. (10):

$$Y = H\Phi X + Z \quad (10)$$

where Y is the vector of received signals; H is the channel-state matrix; X is the vector of native signals x; and Z is the vector representing noise. The right side of Eq. (7) contains a representative example of matrix HΦ. Function CanNotXmitS(PKT, ρ) returns a Boolean "false" when matrix HΦ has only non-zero diagonal elements. Note that, when the number of transmitting nodes is different from the number of receiving nodes, matrix HΦ is not square, and one needs to take a block view of the matrix while trying to identify the diagonal elements. More specifically, in a block view of matrix HΦ, the matrix elements corresponding to different signals intended for the same receiving node are grouped together into a block and considered to be one element. For example, matrix elements $H_{11}C_1$ and $H_{41}C_4$ in the first row of the HΦ matrix shown in Eq. (7) are considered to be a single diagonal element because those matrix elements correspond to signals $x_1$ and $x_4$ intended for the same receiving node $d_1$ (also see FIG. 4).

The mathematical problem of diagonalizing matrix H'=HΦ is given by Eq. (11):

$$\text{minimize } f(W) - \sum_{i=1}^{K} w_i \rho \quad (11)$$

where vector $W = [w_1, w_2, \ldots, w_K]$, and $$\sum_{i=1}^{K} w_i = 1.$$

Function $f(W)$ is calculated using the convex program defined by Eqs. (12a)-(12c):

$$\text{maximize } f(W) = \sum_{i=1}^{K} w_i B \log_2(1 + |h'_{ii}|^2 / N_i) \quad (12a)$$

$$\forall i \neq j, \text{ where } 1 \leq i, j \leq K: h'_{ij} = 0 \quad (12b)$$

$$\forall i, \text{ where } 1 \leq i \leq K: \sum_{j=1}^{K} |\phi_{ij}|^2 \leq P \quad (12c)$$

where B is the bandwidth of the channel in Hz; $N_i$ is the noise at the i-th receiver; $h'_{ij}$ are the matrix elements of matrix H'; $\phi_{ij}$ are the matrix elements of matrix Φ; and P is the maximum permitted transmitter power. In one embodiment, Eq. (11) can be programmed using a gradient approach, under which the largest transmission rate among all sender-receiver pairs gradually decreases its weight while the smallest transmission rate increases its weight until a minimum is found.

Although method 300 has been described in reference to one-hop transmission, one skilled in the art will appreciate that the method can be modified in a relatively straightforward manner to two-hop transmissions and local rerouting. For example, function MaxNonIntR used in the above-described combined implementation of steps 304/306 could be modified to compute a two-hop matching instead of a one-hop matching. Channel-state matrix H could be modified to be a product of the channel-state matrices corresponding to the first and second hops. If there are helper nodes having mixed native signals, then the modified algorithm deals with them in the following manner. First, for the smallest $\sigma_i$, the algorithm looks for a helper node u located one hop away from receiving node $d_i$ that receives a mixed signal containing native signal $x_j$ corresponding to $pkt_j$ ∈ PKT, where j≠i. Then, the algorithm increases $\sigma_i$ by one and looks for another helper node. Once node u is picked as a helper node for a certain native signal, it cannot be chosen for another packet (assuming that DOF=1). This procedure is repeated until no additional helper nodes are available to further increase $\sigma_i$.

While this invention has been described with reference to illustrative embodiments, this description is not intended to be construed in a limiting sense.

Various modifications of the described embodiments, as well as other embodiments of the invention, which are apparent to persons skilled in the art to which the invention pertains are deemed to lie within the principle and scope of the invention as expressed in the following claims.

As used in this specification, the term "zero-forcing" refers to a signal transmission technique, according to which two or more transmitters transmit their respective RF signals so as to force, at a designated receiver, destructive interference of one or more selected signal components, wherein the destructive interference effectively nulls the component(s). The term "interference alignment" refers to a signal transmission technique, according to which two or more transmitters transmit their respective RF signals so as to achieve, at a designated receiver, collinear alignment, in the antenna space, of two or more selected signal components. Interference alignment implies that the receiver has at least two antennas, each capable of independently receiving RF signals. The term "interference cancellation" refers to a signal transmission technique, according to which a designated receiver, upon receiving an RF signal, can remove an unwanted component of that signal using a prior knowledge of the unwanted component, e.g., through the available side information.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, the machine becomes an apparatus for practicing the invention. The present invention can also be embodied in the form of program code, for example, stored in a non-transitory machine-readable storage medium including being loaded into and/or executed by a machine, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

The description and drawings merely illustrate the principles of the invention. It will thus be appreciated that those of ordinary skill in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

It should be appreciated by those of ordinary skill in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term compatible means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they formally fall within the scope of the claims.

What is claimed is:

1. At a first node of a wireless network, a node-implemented method for concurrent transmission of multiple radio-frequency signals between a plurality of transmitting and receiving nodes of the wireless network, the method comprising:
    (A) for a selected time slot, collecting packet-availability information for nodes located within a selected number of hops from the first node;
    (B) for each packet $pkt_k$ in a set of packets available for transmission in said selected time slot, computing a respective maximum number of receiving nodes that are able to receive their intended packets in said selected time slot using any of (i) zero-forcing, (ii) interference-alignment, and (iii) interference-cancellation even if the packet $pkt_k$ is transmitted during said selected time slot concurrently with said intended packets, where k is a packet ID, wherein said set of the packets available for transmission in said selected time slot is identified based on the packet-availability information;
    (C) based on said maximum numbers, determining a largest subset in said set of the packets, said largest subset having a sufficient number of available transmitting nodes to enable corresponding receiving nodes to use, in the selected time slot, said any of (i) zero-forcing, (ii) interference-alignment, and (iii) interference-cancellation for receiving the packets of said largest subset;
    (D) identifying a set of transmitting nodes corresponding to said largest subset of the packets; and
    (E) transmitting one or more trigger messages to said set of transmitting nodes to cause the concurrent transmission of said largest subset of packets in the selected time slot.

2. The method of claim 1, wherein step (A) comprises arranging the packet-availability information in form of a packet availability matrix comprising a plurality of matrix elements $a_{ik}$, wherein each of said matrix elements $a_{ik}$ is a binary value, where i is a node ID.

3. The method of claim 2, wherein step (B) comprises:
(B1) for each packet $pkt_k$, calculating a respective sum of the matrix elements $a_{ik}$; and
(B2) sorting the calculated sums according to their values.

4. The method of claim 1, wherein step (C) comprises:
(C1) for each packet $pkt_k$, finding a maximum matching between a set of transmitting nodes having the packet $pkt_k$ and a set of receiving nodes, wherein the maximum matching includes a destination node for the packet.

5. The method of claim 4, wherein step (C) further comprises:
(C2) for each packet $pkt_k$, finding a set of receiving nodes, for each of which the transmitting nodes from the maximum matching produce no signal interference at the receiving node; and
(C3) calculating a sum of the size of the maximum matching found at step (C1) and the size of the set of receiving nodes found at step (C2).

6. The method of claim 1, wherein, for step (D), the set of transmitting nodes comprises a helper node.

7. The method of claim 6, wherein the helper node had previously opportunistically received a native radio-frequency signal corresponding to a packet from the largest subset of the packets.

8. The method of claim 6, wherein the helper node had previously opportunistically received a mixed radio-frequency signal corresponding to a packet from the largest subset of the packets.

9. The method of claim 1, wherein a trigger message transmitted at step (E) instructs a transmitting node to reroute a packet to be transmitted by said transmitting node.

10. The method of claim 1, wherein step (D) comprises determining weighting coefficients for radio-frequency signals corresponding to the subset of packets so as to zero-force a first unwanted radio-frequency signal at a first receiving node.

11. The method of claim 10, wherein:
the first receiving node has more than one antenna; and
the weighting coefficients are also determined so as to align a second unwanted radio-frequency signal with a third unwanted radio-frequency signal at the first receiving node.

12. The method of claim 10, wherein:
a second receiving node has more than one antenna; and
the weighting coefficients are also determined so as to align a second unwanted radio-frequency signal with a third unwanted radio-frequency signal at the second receiving node.

13. The method of claim 1, wherein:
at least one receiving node has more than one antenna; and
step (D) comprises determining weighting coefficients for radio-frequency signals corresponding to the largest subset of the packets so as to align two or more unwanted radio-frequency signals at said at least one receiving node.

14. The method of claim 1, wherein:
at least one transmitting node has more than one antenna; and
step (D) comprises determining an antenna-partition vector for said at least one transmitting node.

15. The method of claim 1, wherein, for step (A), the selected number of hops is two.

16. The method of claim 1, wherein, for step (E), a trigger message is a MAC-layer message.

17. The method of claim 1, wherein:
a first receiving node already has one of the packets from the largest subset of the packets; and
the set of transmitting nodes found at step (D) enables the first receiving node to use said one of the packets to cancel interference from a corresponding unwanted radio-frequency signal received during the concurrent transmission in the selected time slot.

\* \* \* \* \*